US009221984B2

(12) United States Patent
Li et al.

(10) Patent No.: US 9,221,984 B2
(45) Date of Patent: *Dec. 29, 2015

(54) CROSS-LINKED PIGMENT DISPERSION BASED ON POLYURETHANE DISPERSANTS

(75) Inventors: Xiaoqing Li, Newark, DE (US); Charles T Berge, Earleville, MD (US); Christian Jackson, Wilmington, DE (US); C Chad Roberts, Hockessin, DE (US); Tristan Williams, Cary, NC (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 211 days.

This patent is subject to a terminal disclaimer.

(21) Appl. No.: 13/808,182

(22) PCT Filed: Jul. 13, 2011

(86) PCT No.: PCT/US2011/043811
§ 371 (c)(1),
(2), (4) Date: Jan. 3, 2013

(87) PCT Pub. No.: WO2012/009408
PCT Pub. Date: Jan. 19, 2012

(65) Prior Publication Data
US 2013/0102729 A1  Apr. 25, 2013

Related U.S. Application Data

(60) Provisional application No. 61/364,979, filed on Jul. 16, 2010.

(51) Int. Cl.
| *C08G 18/08* | (2006.01) |
| *C08K 3/20* | (2006.01) |
| *C08L 75/00* | (2006.01) |
| *C09D 11/00* | (2014.01) |
| *C09D 5/00* | (2006.01) |
| *C09D 7/12* | (2006.01) |
| *C09B 67/08* | (2006.01) |
| *C09D 175/04* | (2006.01) |
| *C09B 67/20* | (2006.01) |
| *C09B 67/46* | (2006.01) |
| *C09D 11/326* | (2014.01) |
| *C09B 67/00* | (2006.01) |

(52) U.S. Cl.
CPC ............ *C09D 7/125* (2013.01); *C09B 67/009* (2013.01); *C09B 67/0013* (2013.01); *C09B 67/0022* (2013.01); *C09B 67/0023* (2013.01); *C09B 67/0066* (2013.01); *C09D 11/326* (2013.01); *C09D 175/04* (2013.01)

(58) Field of Classification Search
CPC .............. C09B 67/0013; C09B 67/009; C09B 67/0022; C09B 67/0023; C09B 67/0066; C09D 7/125; C09D 11/326; C09D 175/04
USPC ................... 523/160, 161; 524/591, 839, 840
See application file for complete search history.

(56) References Cited

U.S. PATENT DOCUMENTS

| 3,479,310 | A | 11/1969 | Dieterich et al. | |
| 4,108,814 | A | 8/1978 | Reiff et al. | |
| 4,408,008 | A | 10/1983 | Markusch | |
| 6,136,890 | A | 10/2000 | Carlson et al. | |
| 6,316,586 | B1 | 11/2001 | Sunkara et al. | |
| 2004/0249088 | A1 | 12/2004 | Hees et al. | 525/453 |
| 2009/0306285 | A1 | 12/2009 | Li et al. | |
| 2010/0143589 | A1 | 6/2010 | Spinelli | |
| 2012/0214939 | A1* | 8/2012 | Li et al. | 524/591 |
| 2012/0220718 | A1* | 8/2012 | Li et al. | 524/591 |
| 2013/0137816 | A1* | 5/2013 | Berge et al. | 524/591 |

FOREIGN PATENT DOCUMENTS

| JP | 2000-154227 A | 6/2000 |
| WO | WO 03/029318 A1 | 4/2003 |
| WO | WO 2006/132910 A2 | 12/2006 |
| WO | WO 2007/023145 A2 | 3/2007 |
| WO | 2011-063185 A1 | 5/2011 |
| WO | 2011-063190 A1 | 5/2011 |

OTHER PUBLICATIONS

European Patent Office, Munich [DE], Extended European Search Report, EP 11 80 7434 (2 593 517), Dec. 4, 2013, EP counterpart of the present application.

* cited by examiner

*Primary Examiner* — Patrick Niland
(74) *Attorney, Agent, or Firm* — John H. Lamming

(57) ABSTRACT

The present disclosure provides an aqueous dispersion containing a colorant and a polyurethane dispersant, wherein the polyurethane dispersant is a polymer having a cross-linkable moiety, wherein the cross-linkable moiety is cross-linked, with a cross-linking agent.

20 Claims, No Drawings

CROSS-LINKED PIGMENT DISPERSION BASED ON POLYURETHANE DISPERSANTS

CROSS REFERENCE TO RELATED APPLICATIONS

This application claims priority under 35 U.S.C. §119 from U.S. Provisional Application Ser. No. 61/364,979, filed Jul. 16, 2010, which is incorporated by reference in its entire.

BACKGROUND OF THE DISCLOSURE

This disclosure relates to novel aqueous dispersions of colorants and polyurethane dispersants containing cross-linkable moieties, the cross-linked polyurethane dispersants that produce the stable aqueous colorant dispersions, the process of making same and their use thereof in ink-jet inks.

Aqueous dispersions of pigment particles are widely used in ink-jet printing. Because a pigment is typically not soluble in an aqueous vehicle, it is often required to use a dispersing agent, such as a polymeric dispersant or a surfactant, to produce a stable dispersion of the pigment in the aqueous vehicle. However, because the pigment is dispersed in a liquid vehicle, there is a tendency for pigment particles to agglomerate or flocculate while the ink is being stored or while the ink is being used, for example, being printed.

There has been effort in the art directed at improving the stability of pigment dispersions. The effort to improve dispersion stability to date has included improvements in the processes used to make the dispersions, the development of new dispersants and the exploration of the interaction between dispersants and pigment particles, and between dispersants and aqueous vehicle. While much of the effort has general application at improving dispersion stability, some of that effort has not found utility in particular applications. For example, the pigment dispersions used in ink-jet printing applications have very unique and demanding requirements. It is critical that ink components comprising pigment dispersion remain stable, not only in storage but also over repeated jetting cycles. It is also desirable that the pigment dispersions offer good durability, good rub-fastness, wet-fastness and highlighter pen fastness.

A need exists for highly stable, higher-quality and different property inks for ink-jet applications. Although improvements in polymeric dispersants have significantly contributed to improved ink-jet inks, the current dispersants still do not provide inks with the requisite stability, durability, optical density and chroma needed for ink-jet applications. The present disclosure satisfies this need by providing a cross-linked pigment dispersion based on a polyurethane dispersant having cross-linkable moieties pendent to the polymer backbone and dispersing moieties both pendent to the polymer backbone and terminal to the polymer chain, and the cross-linking of the cross-linkable moieties with a cross-linking agent.

SUMMARY OF THE DISCLOSURE

An embodiment provides an aqueous pigment dispersion comprising a colorant and a polyurethane dispersant, wherein said polyurethane dispersant is comprised of a polymer with:

(a) an aqueous dispersing moiety, wherein said dispersing moiety is pendent to the polymer backbone and terminal to the polymer chain, and said dispersing moiety is selected from the group consisting of —COOM, —OPO$_3$M$_2$, —PO$_3$M$_2$, —SO$_3$M, —(CH$_2$CHR$^5$O)$_n$—CH$_3$; and mixtures thereof; and (b) a cross-linkable moiety that is cross-linked with a cross-inking agent, wherein said cross-linkable moiety is pendent to the polymer backbone;

wherein the polyurethane dispersant comprises at least one compound of the general structure of Formula I:

$$X_{\diagdown R^3}{-}Y{-}\underset{O}{\overset{}{C}}{-}\overset{H}{N}{-}\left(R^1{-}\overset{H}{N}{-}\underset{O}{\overset{}{C}}{-}W{-}R^2{-}W{-}\underset{O}{\overset{}{C}}{-}\overset{H}{N}\right)_n{-}R^1{-}\overset{H}{N}{-}\underset{O}{\overset{}{C}}{-}Y{-}R^3{-}X \quad (I)$$

wherein each X is independently —OPO$_3$M$_2$, —PO$_3$M$_2$, —SO$_3$M or —(CH$_2$CHR$^5$O)$_n$—CH$_3$;

each M is independently Na, H or N(R$^6$)$_4$;

each Y is independently O, S or NR$^4$;

each W is independently N, O or S;

each R$^1$ is independently C$_1$-C$_{20}$ alkyl, C$_3$-C$_{20}$ substituted alkyl, C$_6$-C$_{40}$ aryl or C$_9$-C$_{40}$ substituted aryl;

R$^2$ is comprised of difunctional isocyanate reactants Z$^1$ and Z$^2$, and a hydrophobic polyol Z$^3$, wherein there is at least one Z$^1$, at least one Z$^2$ and at least one Z$^3$;

each R$^3$ is independently C$_1$-C$_{20}$ alkyl, C$_3$-C$_{20}$ substituted alkyl or straight bond, provided that when R$^3$ is a straight bond, X is —(CH$_2$CHR$^5$O)$_n$—CH$_3$;

each R$^4$ is independently —R$^3$—X, H, C$_1$-C$_{20}$ alkyl or substituted alkyl;

each R$^5$ is independently H or C$_1$-C$_{12}$ alkyl;

each R$^6$ is independently H, C$_1$-C$_{20}$ alkyl, C$_7$-C$_{20}$ aralkyl or C$_6$-C$_{40}$ aryl;

n is an integer from 2 to 30;

Z$^1$ is a difunctional isocyanate reactant substituted with an aqueous dispersing moiety;

Z$^2$ is a difunctional isocyanate reactant substituted with one or more cross-linkable moieties; and Z$^3$ is a hydrophobic polyol with MW less than 3000.

Another embodiment provides that the cross-linking agent is one or more members selected from the group consisting of epoxide, isocyanate carbodiimide. N-methylol, oxazoline, silane, and mixtures thereof.

Another embodiment provides that Z$^1$ is a diol substituted with the aqueous dispersing moiety.

Another embodiment provides that Z$^2$ is a din substituted with one or more cross-linkable moieties.

Another embodiment provides that the aqueous dispersing moiety consists of one or more carboxyl groups.

Another embodiment provides that the cross-linkable moiety consists of one or more carboxyl groups.

Another embodiment provides that each Y is NR$^4$.

Another embodiment provides that each X is —(CH$_2$CHR$^5$O)$_n$—CH$_3$.

Another embodiment provides that each X is —SO$_3$M.

Another embodiment provides that each R$^4$ is —R$^3$—X.

Another embodiment provides that each W is O.

Another embodiment provides that each W is N.

Another embodiment provides that the mole ratio of the cross-linkable moiety to the cross-linking agent is from 15:1 to 1:1.5.

Another embodiment provides that the mole ratio of the cross-linkable moiety to the cross-linking agent is from 9:1 to 1:1

Another embodiment provides that the mole ratio of the cross-linkable moiety to the cross-linking agent is from 8:1 to 1:1.

Yet another embodiment provides an aqueous ink-jet ink comprising an ink vehicle and an aqueous dispersion, wherein said aqueous dispersion comprises a colorant and a polyurethane dispersant, wherein said polyurethane dispersant is as set forth above.

These and other features and advantages of the present embodiments will be more readily understood by those of ordinary skill in the art from a reading of the following Detailed Description. Certain features of the disclosed embodiments which are, for clarity, described above and below as a separate embodiment, may also be provided in combination in a single embodiment. Conversely, various features of the disclosed embodiments that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this disclosure pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, the dispersions produced with the polyurethane described above can be utilized to disperse particles, especially pigments for ink-jet inks. These inks can be printed on all normally used ink-jet substrates including textile substrates.

As used herein, the term "dispersion" means a two phase system where one phase consists of finely divided particles (often in the colloidal size range) distributed throughout a bulk substance, of the particles being the dispersed or internal phase and the bulk substance being the continuous or external phase.

As used herein, the term "dispersant" means a surface active agent added to a suspending medium to promote uniform and maximum separation of extremely fine solid particles often of colloidal size. For pigments, dispersants are most often polymeric dispersants. The polyurethane dispersants described herein are in fact dispersions themselves.

As used herein, the term "OD" means optical density.

As used herein, the term "aqueous vehicle" refers to water or a mixture of water and at least one water-soluble, or partially water-soluble (i.e. methyl ethyl ketone), organic solvent (co-solvent).

As used herein, the term "ionizable groups," means potentially ionic groups.

As used herein, the term "substantially" means being of considerable degree, almost all.

As used herein, the term "MW" means weight average molecular weight.

As used herein, the term "Mv" means mean volume particle diameter, a type of particle size measurement.

As used herein, the term "PDI" means polydispersity index, a measure of the distribution of molecular mass in a given polymer sample. A PDI is calculated by dividing the weight average molecular weight with the number average molecular weight.

As used herein, the term "D50" means the volume particle diameter of the 50th percentile (median) of the distribution of particle sizes.

As used herein, the term "D95" means the volume particle diameter of the 95th percentile of the distribution of particle sizes.

As used herein, the term "%<204 nm" means percentage of particles with sizes less than 204 nm.

As used herein, the term "pendent" means that a substituent is directly attached to the backbone of a polymer or via a linkage of 1 to 10 atoms.

As used herein, the term "NCO" means isocyanate.

As used herein, the term "cPs" means centipoise, a viscosity unit.

As used herein, the term "mN·m$^{-1}$" means milliNewtons per meter, a surface tension unit.

As used herein, the term "mPa·s" means millipascal second, a viscosity unit.

As used herein, the term "prepolymer" means the polymer that is an intermediate in a polymerization process, and can be considered a polymer.

As used herein, the term "AN" means acid number, mg KOH/gram of solid polymer.

As used herein, the term "PUD" means the polyurethanes dispersions described herein.

As used herein, the term "BMEA" means bis(methoxyethyl)amine.

As used herein, the term "DBTDL," means dibutyltin dilaurate,

As used herein, the term "DEA" means diethanolamine.

As used herein, the term "DMPA" means dimethylol propionic acid.

As used herein, the term "HDI" means 1,6-hexamethylene diisocyanate.

As used herein, the term "IPDI" means isophorone diisocyanate.

As used herein, the term "TMDI" means trimethylhexamethylene diisocyanate,

As used herein, the term "TMXDI" means m-tetramethylene xylylene diisocyanate.

As used herein, the term "NMP" means n-Methyl pyrrolidone.

As used herein, the term "TDI" means 2,4-toluene diisocyanate.

As used herein, the term "MDI" means 4,4'-diphenylmethane diisocyanate.

As used herein, the term "$H_{12}$MDI" means 4,4'-dicyclohexylmethane diisocyanate.

As used herein, the term "TODI" means 3,3'-dimethyl-4,4'-biphenyl diisocyanate

As used herein, the term "$C_{12}$DI" means dodecane diisocyanate,

As used herein, the term "NDI" means 1,5-naphthalene diisocyanate.

As used herein, the term "IPDI" means isophorone diisocyanate.

As used herein, the term "TEB" means triethylene glycol monobutyl ether, a reagent supplied by Dow Chemical.

As used herein, the term "Sulfolane" means tetramethylene sulfone.

As used herein, the term "TRB-2" means Dainichiseika® TRB-2, a cyan pigment,

As used herein, Terathane® 650 is a polyether diol from Invista, Wichita, Kans.

As used herein, Eternacoll® UH-50 is a polycarbonate diol from UBE Industries, Tokyo, Japan.

As used herein, Denacol® 321 is trimethylolpropane polyglycidyl ether, a cross-linking reagent from Nagase Chemicals Ltd., Osaka, Japan.

As used herein, Tergitol 15-S-7 is a secondary alcohol ethoxylate supplied by Dow Chemical.

As used herein, Poly-EPS 520-Na means α,ο-polypropyleneglycoldiamine-sulfopropylated, sodium salt, a reagent supplied by RASCHIG AG, Ludwigshafen, Germany.

As used herein, the term "PolyTHF" means polytetrahydrofuran, a polymer created by linking a series of units derived from tetrahydrofuran.

Unless otherwise noted, the above chemicals were obtained from Aldrich (Milwaukee, Wis.) or other similar suppliers of laboratory chemicals.

In addition, references in the singular may also include the plural (for example, "a" and "an" may refer to one, or one or more) unless the context specifically states otherwise.

Polyurethane Dispersants

Polyurethane polymers are, for the purposes of the present disclosure, polymers wherein the polymer backbone contains urethane linkage derived from the reaction of an isocyanate group (from, e.g., a di- or higher-functional monomeric, oligomeric or polymeric polyisocyanate) with a hydroxyl group (from, e.g., a di- or higher-functional monomeric, oligomeric or polymeric polyol). Such polymers may, in addition to the urethane linkage, also contain other isocyanate-derived linkages such as urea, as well as other types of linkages present in the polyisocyanate components or polyol components (such as, for example, ester and ether linkage).

The polyurethane dispersant of an embodiment comprises a one compound of the general structure of Formula I:

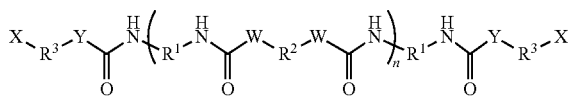

(I)

wherein each X is independently —COOM, —OPO$_3$M$_2$, —PO$_3$M$_2$, —SO$_3$M, or —(CH$_2$CHR$^5$O)$_n$—CH$_3$;

each M is independently Na, K, Li, H or N(R$^6$)$_4{}^+$;

each Y is independently O, S or NR$^4$;

each W is independently N, O or S;

each R$^1$ is independently C$_1$-C$_{20}$ alkyl, C$_3$-C$_{20}$ substituted alkyl, C$_6$-C$_{40}$ an or C$_9$-C$_{40}$ substituted aryl;

R$^2$ is comprised of difunctional isocyanate reactants Z$^1$ and Z$^2$, and a hydrophobic polyol Z$^3$, wherein there is at least one Z$^1$, at least one Z$^2$ and at least one Z$^3$;

each R$^3$ is independently C$_1$-C$_{20}$ alkyl, C$_3$-C$_{20}$ substituted alkyl or a straight bond, provided that when R$^3$ is a straight bond, X is —(CH$_2$CHR$^5$O)$_3$C$_3$;

each R$^4$ is independently H, C$_1$-C$_{20}$ alkyl or C$_3$-C$_{20}$ substituted alkyl;

each R$^5$ is independently H or C$_1$-C$_{12}$ alkyl;

each R$^6$ is independently H, C$_{20}$ alkyl, C$_7$-C$_{20}$ aralkyl or C$_6$-C$_{40}$ aryl;

n is an integer from 2 to 30;

Z$^1$ is a difunctional isocyanate reactant substituted with an aqueous dispersing moiety;

Z$^2$ is a difunctional isocyanate reactant substituted with one or more cross-linkable moieties; and Z$^3$ is a hydrophobic polyol with MW less than 3000.

The key features of the polyurethane dispersant are the cross-linkable moieties that are pendent to the polymer backbone, and the dispersing moieties that are pendent to the polymer backbone and terminal to the polymer chain. The term "pendent" means that a substituent is directly attached to the backbone of a polymer or via a linkage of between 1 to 10 atoms. Typically, the cross-linkable moieties that are pendent to the polymer backbone reside in the R$^2$ group of Formula I. Specifically the Z$^2$ component in R$^2$ is a diol substituted with one or more cross-linkable moieties. Typically these cross-linkable moieties are carboxyl, hydroxyl, amino or mecapto groups. These cross-linkable moieties, upon reacting with a cross-linking agent, provide a cross-linked pigment dispersion having superior properties.

The R$^2$ group in Formula I is comprised of difunctional isocyanate reactants Z$^1$ and Z$^2$, and hydrophobic polyol Z$^3$, wherein there is at least one Z$^1$, at least one Z$^2$ and at least one Z$^3$. The Z$^3$ group provides the polyurethanes with significant areas of hydrophobic segment which can be effective in dispersing pigments. While not being bound by theory, these areas of hydrophobic segment may be effective as the part of the dispersant that is associated with the pigment surfaces. The polyurethane dispersant must have at least one Z$^1$, at least one Z$^2$ and at least one Z$^3$ to satisfy the requirements that the polyurethane contains aqueous dispersing moieties both pendent to the polymer backbone and terminal to the polymer chain while having cross-linkable moieties pendent to the polymer backbone. The blending of Z$^1$, Z$^2$ and Z$^3$ in the polyurethane can be in any sequence. In certain circumstances, Z$^2$ can be the same as Z$^1$ as long as there are cross-linkable moieties and dispersing moieties on Z$^2$; and in some other circumstances, Z$^2$ can be the same as Z$^3$ when Z$^2$ is a polyol with cross-linkable moieties and no aqueous dispersing moieties. Depending on the sequence of addition during the synthesis of the polyurethane, the R$^2$ component (combination of Z$^1$, Z$^2$ and Z$^3$) can be random or in blocks.

Hydrophobic Polyol (Z$^3$)

Often hydrophobic polyol Z$^3$ is derived from polyolefins that are available from Shell as KRATON LIQUID L and Mitsubishi Chemical as POLYTAIL H. More specifically, Z$^3$ can be derived from polyester diols, polycarbonate dials, polyestercarbonate diols and polyacrylate diols.

Suitable polyester polyols include reaction products of polyhydric; dihydric alcohols to which trihydric alcohols may optionally be added, and polybasic (typically dibasic) carboxylic acids. Trihydric alcohols are limited to at most about 2 weight % such that some branching can occur but no significant cross-linking would occur, and may be used in cases in which modest branching of the NCO prepolymer or polyurethane is desired. Instead of these polycarboxylic acids, the corresponding carboxylic acid anhydrides, or polycarboxylic acid esters of lower alcohols, or mixtures thereof may be used for preparing the polyesters The polycarboxylic acids may be aliphatic, cycloaliphatic, aromatic or heterocyclic or mixtures thereof and they may be substituted, for example, by halogen atoms, or unsaturated. The following are mentioned as examples: succinic acid, adipic acid, suberic acid, azelaic acid, sebacic acid, 1,12-dodecyldioic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, which may be mixed with monomeric fatty acids, dimethyl terephthalates and bis-glycol terephthalate, Typically, polyester diols can be blended with hydroxyl terminated poly(butylene adipate), poly(butylene succinate), poly(ethylene adipate), poly(1,2-propylene adipate), poly(trimethylene adipate), poly(trimethylene succinate), polylactic acid ester diol and polycaprolactone diol. Other hydroxyl terminated polyester diols are copolyethers comprising repeat units derived from a diol and a sulfonated dicarboxylic acid and prepared as described in U.S. Pat. No. 6,316,586.

Polycarbonates containing hydroxyl groups include those known, such as the products obtained front the reaction of diols such as propanediol-(1,3), butanediol-(1,4) or hexanediol-(1,6), diethylene glycol, triethylene glycol or tetraethylene glycol, and higher polyether diols with phosgene, diarylcarbonates such as diphenylcarbonate, dialkylcarbonates such as diethylcarbonate, or with cyclic carbonates such as ethylene or propylene carbonate. Also suitable are polyester carbonates obtained from the above-mentioned polyesters or polylactones with phosgene, diaryl carbonates, dialkyl carbonates or cyclic carbonates.

Polycarbonate diols for blending are optionally selected from the group consisting of polyethylene carbonate diol, polytrimethylene carbonate diol, polybutylene carbonate diol and polyhexylene carbonate.

Poly(meth)acrylates containing hydroxyl groups include those common in the art of addition polymerization such as cationic, anionic and radical polymerization and the like. Examples are alpha-omega diols. An example of these type of diols are those which are prepared by a "living" or "control" or chain transfer polymerization processes which enables the placement of one hydroxyl group at or near the termini of the polymer. For further examples of making these diols, see: U.S. Pat. Nos. 6,248,839 and 5,990,245.

The MW for the polyols described above is typically less than 5000. Typically the MW for $Z^3$ (a polyol) is less than 3000.

Difunctional Isocyanate Reactant ($Z^1$)

The difunctional isocyanate reactant $Z^1$ in Formula I contains an aqueous dispersing moiety that is ionic or ionizable, in the context of this disclosure, the term "isocyanate reactant", or "Isocyanate reactive", is taken to include groups well known to those of ordinary skill in the relevant art to react with isocyanates, and typically include hydroxyl, primary amino and secondary amino groups. The term "difunctional" means containing two of the isocyanate reactive groups.

Examples of ionic dispersing groups include carboxylate groups (—COOM), phosphate groups (—OPO$_3$M$_2$), phosphonate groups (—PO$_3$M$_2$), sulfonate groups (—SO$_3$M), wherein M is a cation such as a monovalent metal ion (e.g. Na$^+$, K$^+$, Li$^+$, etc.), H$^+$ or NR$_4^+$; and each R can independently be an alkyl, aralkyl, aryl or hydrogen.

The ionizable groups in general correspond to the ionic groups, except that they are in the acid (such as carboxyl —COOH) or base (such as primary, secondary or tertiary amine —NH$_2$, —NRH, or —NR$_2$) form. The ionizable groups are such that they are readily converted to their ionic form during the dispersion/polymer preparation process as discussed below.

With respect to compounds which contain isocyanate reactive groups and ionic or potentially ionic groups, the isocyanate reactive groups are typically amino and hydroxyl groups. The potentially ionic groups or their corresponding ionic groups may be cationic or anionic, although the anionic groups are preferred. Specific examples of anionic groups include carboxylate and sulfonate groups. Examples of cationic groups include quaternary ammonium groups and sulfonium groups.

In the case of anionic group substitution, the groups can be carboxylic acid groups, carboxylate groups, sulphonic acid groups, sulphonate groups, phosphoric acid groups and phosphonate groups. The acid salts are formed by neutralizing the corresponding acid groups either prior to, during or after formation of the NCO prepolymer.

Suitable compounds for incorporating carboxyl groups are described in U.S. Pat. Nos. 3,479,310, 4,108,814 and 4,408,008. Examples of carboxylic group-containing compounds are the hydroxy-carboxylic acids corresponding to the formula (HO)$_p$Q(COOH)$_q$, wherein Q is C$_1$-C$_{10}$ alkyl, p is 1 or 2, and q is 1 to 3. Examples of these hydroxy-carboxylic acids include citric acid, tartaric acid and hydroxypivalic acid. Optional dihydroxy alkanoic acids include the α,α-dimethylol alkanoic acids represented by the structure of Formula II below:

(II)

wherein Q' is hydrogen or C$_1$-C$_8$ alkyl. Additional α,α-dimethylol alkanoic acids are represented by the structural formula R$^5$C—(CH$_2$OH)$_2$—COOH, wherein R$^5$ is hydrogen or C$_1$-C$_8$ alkyl. Examples of these ionizable diols include, but are not limited to, dimethylolacetic acid, 2,2'-dimethylolbutanoic acid, 2,2'-dimethylolpropionic acid (DMPA), and 2,2'-dimethylolbutyric acid. Suitable carboxylates also include H$_2$N—(CH$_2$)$_4$—CH(CO$_2$H)—NH$_2$, and H$_2$N—CH$_2$—CH$_2$—NH—CH$_2$—CH$_2$—CO$_2$Na.

Typical sulfonate groups for incorporation into the polyurethanes include diol sulfonates described in U.S. Pat. No. 4,108,814. Suitable diol sulfonate compounds also include hydroxyl terminated copolyethers comprising repeat units derived from the reaction of a diol and a sulfonated dicarboxylic acid. Specifically, the sulfonated dicarboxylic acid is 5-sulfo-isophthalic acid and the diol is 1,3-propanediol. Other suitable sulfonates include the ones represented by formula H$_2$N—CH$_2$—CH$_2$—NH—(CH$_2$)$_r$—SO$_3$Na, wherein r is 2 or 3.

When the ionic stabilizing groups are acids, the acid groups are incorporated in an amount sufficient to provide an acid group content for the polyurethane, known by those skilled, in the art as acid, number (mg KOH per grain solid polymer), of at least 6, typically at least 10, and even more typically 20 milligrams KOH per 1.0 gram of polyurethane. The upper limit for the acid number (AN) is about 120, and typically about 100.

Within the context of this disclosure, the term "neutralizing agents" is meant to embrace all types of agents which are useful for converting potentially ionic or ionizable groups to ionic groups. When amines are used as the neutralizing agent, the chain terminating reaction producing the urea termination is typically completed prior to the addition of the neutralizing agent that can also act as an isocyanate reactive group.

In order to convert an anionic group to its salt form before, during or after its incorporation into a prepolymer, either volatile or nonvolatile basic materials may be used to form the counterion of the anionic group. Volatile bases are those wherein at least about 90% of the base used to form the counterion of the anionic group volatilizes under the conditions used to remove water from the aqueous polyurethane dispersions. Nonvolatile bases are those wherein at least about 90% of the base does not volatilize under the conditions used to remove water from the aqueous polyurethane dispersions.

Suitable volatile basic organic compounds for neutralizing the potential anionic groups are the primary, secondary or tertiary amines. Examples of these amines are trimethyl amine, triethyl amine, triisopropyl amine, tributyl amine, N,N-dimethyl-cyclohexyl amine, N,N-dimethylstearyl amine, N,N-dimethylaniline, N-methylmorpholine, N-ethylmorpholine, N-methylpiperazine, N-methylpyrrolidine, N-methylpiperidine, N,N-dimethyl-ethanol amine, N,N-diethyl-ethanol amine, triethanolamine, N-methyldiethanol amine, dimethylaminopropanol, 2-methoxyethyldimethyl amine, N-hydroxyethylpiperazine, 2-(2-dimethylaminoethoxy)-ethanol and 5-dimethylamino-2-pentanone.

Suitable nonvolatile bases include alkoxides, hydroxides, carbonates or bicarbonates of monovalent metals, especially the alkali metals, lithium, sodium and potassium.

When the anionic groups on the polyurethane are neutralized, they provide hydrophilicity to the polymer and better enable it to stably disperse pigment in water. However, it may be desirable to control the degree of neutralization. When the anionic groups on the polyurethane are partially neutralized, the polyurethane becomes more hydrophobic and therefore adsorbs onto the pigment surface. Reducing the amount of the un-adsorbed polymer from the pigment dispersion provides an advantageous condition for the cross-linkable moieties on the polyurethane, adsorbing onto the pigment surface, to react with a cross-linking agent without the competition from cross-linkable moieties on the un-adsorbed polyurethane. Typically the degree of neutralization is from 40% to 100% %, and more typically from 50% to 70%, depending on the acid number of the polyurethane.

Capping of the Polyurethane

The capping agent for terminating the polyurethane chain is usually a primary or secondary amine, an alcohol, or a mecapto. In Formula I, the capping agent is shown as a X—$R^3$—Y— substituent on the polyurethane.

The amount of capping agent employed should be approximately equivalent to the free isocyanate groups in the prepolymer. The ratio of active hydrogens from amine in the capping agent to isocyanate groups in the prepolymer is in the range of from about 1.0:1.0 to about 3.0:1.0, more typically from about 1.0:1.0 to about 1.5:1.0, and still more typically from about 1.0:1.0 to about 1.05:1, on an equivalent basis. Although any isocyanate groups that are not terminated with an amine can react with other isocyanate reactive functional group or water, the ratios of capping agent to isocyanate group is chosen to ensure a urea termination. Amine termination of the polyurethane is avoided by the choice and amount of capping agent leading to a urea terminated polyurethane. This results in better molecular weight control and better properties when used as a particle dispersant, and ease in handling when added to formulations.

Any primary or secondary amines substituted with aqueous dispersing moieties may be used as chain terminators. Especially useful are aliphatic primary or secondary monoamines, or diamines. Example of amines useful as chain terminators include, but are not restricted to, beta-Alanine, Taurine and Jeffamine M600. Examples of alcohols useful as chain terminators include, but are not restricted to, Tergitol 15-S-7 and carbowax.

Polyisocyanate Component

Suitable polyisocyanates are those that contain either aromatic, cycloaliphatic or aliphatic groups bound to the isocyanate groups. Mixtures of these compounds may also be used. If aromatic isocyanates are used, cycloaliphatic or aliphatic isocyanates can be present as well.

Any diisocyanate useful in preparing polyurethanes via its reaction with polyether glycols, diols or amines can be used in this disclosure.

Examples of suitable diisocyanates include, but are not limited to, 2,4-toluene diisocyanate (TDI), 2,6-toluene diisocyanate, trimethyl hexamethylene diisocyanate (TMDI), 4,4'-diphenylmethane diisocyanate (MDI), 4,4'-dicyclohexylmethane diisocyanate ($H_{12}$MDI), 3,3'-dimethyl-4,4'-diisocyanate (TODI), dodecane diisocyanate ($C_{12}$DI), m-tetramethylene xylylene diisocyanate (TMXDI), 1,4-benzene diisocyanate, trans-cyclohexane-1,4-diisocyanate, 1,5-naphthalene diisocyanate (NDI), 1,6-hexamethylene (HDI), 4,6-xylyene diisocyanate, isophorone diisocyanate (IPDI), and combinations thereof.

Small amounts, typically less than about 3% by weight based on the weight of the diisocyanate, of monoisocyanates or polyisocyanates can be used in a mixture with the diisocyanate. Examples of useful monoisocyanates include alkyl isocyanates such as octadecyl isocyanate and aryl isocyanates such as phenyl isocyanate. Examples of useful polyisocyanates are triisocyanatotoluene trimer and polymeric MDI.

Cross-Linking of Dispersant

The polyurethane dispersants have cross-linkable, functional moieties pendent to the polymer backbone. The dispersants are thus capable of reacting with a cross-linking compound. Identified in the table below are suitable cross-linkable functional groups that are in the polymeric dispersant and the companion cross-linking groups that may be present in the cross-linking compound.

| Cross-linkable Moieties | Cross-linking Groups |
| --- | --- |
| COOH | Epoxide, Carbodiimide, Oxazoline, N-Methyol |
| Hydroxyl | Epoxide, Silane, Isocyanate, N-Methyol |
| Amino | Epoxide, Carbodiimide, Oxazoline, N-Methyol |

The cross-linkable moieties can be incorporated into the $R^2$ group (in Formula I) of the polyurethane dispersant by selection of appropriate $Z^2$. Mixtures of these cross-linkable moieties may also be present in the polyurethane dispersant. Useful cross-linking agents are compounds soluble or dispersible in the aqueous vehicle having two or more cross-linking functional groups with MW in the range of 100-20,000. Suitable cross-linking agents include m-tetramethylxylene diisocyanate (TMXDI), isophorone diisocyanate (IPDI), trimethylpropane polyglycidyl ether, polyglycerol polyglycidyl ether, oxazoline-functional polymers, waterborne polycarbodiimide resin, and silane.

The mole ratio of the cross-linkable moiety on the polymer chain to the cross-linking groups on the cross-linking agent is from 15:1 to 1:1.5, typically from 9:1 to 1:1.1, and most typically from 8:1 to 1:1. In calculating the mole ratio, all cross-linkable moieties on the polymer chain and all cross-linking groups on the cross-linking agent are included Colorants A wide variety of organic and inorganic pigments, alone or in combination, may be dispersed with the polyurethane dispersant to prepare an ink, especially an ink-jet ink. The term "pigment" as used herein means an insoluble colorant that requires to be dispersed with a dispersant and processed under dispersive conditions in the presence of a dispersant. The colorant also includes dispersed dyes. The dispersion process results in a stable dispersed pigment. The pigment used with the inventive polyurethane dispersants does not include self-dispersed pigments. The pigment particles are sufficiently small to permit free flow of the ink through the ink-jet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Typically, the pigment particle size should range from about 0.005 to about 5 micron and, most typically, from about 0.005 to about 1 micron. The average particle size as measured by dynamic light scattering is less than about 500 nm, typically less than about 300 nm.

The selected pigment(s) may be used in dry or wet form. For example, pigments are usually manufactured in aqueous media, and the resulting pigments are obtained as a water-wet presscake. In presscake form, the pigment does not agglomerate to the extent like it is in dry form. Thus, pigments in water-wet presscake form do not require as much mixing energy to de-agglomerate in the premix process as pigments in dry form. Representative commercial dry pigments are listed in U.S. Pat. No. 5,085,698.

Some examples of pigments with coloristic properties useful in inkjet inks include: cyan pigments from Pigment Blue 15:3 and Pigment Blue 15:4; magenta pigments from Pigment Red 122 and Pigment Red 202; yellow pigments from Pigment Yellow 14, Pigment Yellow 95, Pigment Yellow 110, Pigment Yellow 114, Pigment Yellow 128 and Pigment Yellow 155; red pigments from Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; green pigments from Pigment Green 1. Pigment Green 2, Pigment Green 7 and Pigment Green 36; blue pigments from Pigment Blue 60, Pigment Violet 3, Pigment Violet 19, Pigment Violet 23, Pigment Violet 32, Pigment Violet 36 and Pigment Violet 38; white pigments such as $TiO_2$ and ZnO; and black pigment carbon black. The pigment names and abbreviations used herein are the "C.I." designation for pigments established by Society of Dyers and Colourists, Bradford, Yorkshire, UK and published in *The Color Index*, Third Edition, 1971.

In the case of organic pigments, the ink may contain up to approximately 30%, typically from 0.1% to about 25%, and more specifically from 0.25% to 10% of pigment, by weight based on the total ink weight. If an inorganic pigment is selected, the ink will tend to contain higher percentages by weight of pigment than with comparable inks employing organic pigment, since inorganic pigments generally have higher densities than organic pigments.

The polyurethane polymer dispersant is typically present in the range of from 0.1% to 20%, and more specifically from 0.2% to about 10%, by weight based on the weight of the total ink composition, Preparation of Polyurethane Dispersant The polyurethane dispersants of the present embodiments can be prepared by a one-step mixing or a stepwise method. The physical form of the polyurethane prior to its use as a dispersant is an aqueous dispersion. In the one-step mixing process, isocyanate terminated polyurethane is prepared by mixing $Z^1$, $Z^2$ and $Z^3$ in a solvent, followed by adding a diisocyanate to the mixture. This reaction is conducted at from about 40° C. to about 100° C., and typically from about 50° C. to about 90° C. The ratio of isocyanate to isocyanate reactive groups ($Z^1$, $Z^2$ and $Z^3$) is from about 1.3:1 to about 1:1, and more typically from about 1, 25:1 to about 1.05:1. When the targeted percentage of isocyanate content is reached, a primary or secondary amine capping agent is added. The polyurethane solution is then converted to an aqueous dispersion via the addition of de-ionized water under a high shearing operation. Volatile solvent(s), if present, are distilled under reduced pressure.

The NCO-functional prepolymers should be substantially linear, and this may be achieved by maintaining the average functionality of the prepolymer starting components at or below 2:1.

In the stepwise method, a polyurethane is prepared by dissolving the $Z^1$ reactant in a solvent, followed by adding a diisocyanate to the mixture. Once the initial percentage of isocyanate content target is reached, the $Z^2$ and $Z^3$ components are added. This reaction is conducted at from about 40° C. to about 100° C., and typically from about 50° C. to about 90° C. The typical ratio of isocyanate to isocyanate reactive groups is from about 1.3:1 to about 1.05:1, and more typically from about 1.25:1 to about 1, 1:1. Alternately, the $Z^2$ and $Z^3$ reactants may be reacted in the first step, and the $Z^1$ reactant may be added after the initial percentage of isocyanate content target is reached. When the final targeted percentage of isocyanate content is reached, a capping agent is added. The polyurethane solution is then converted to an aqueous polyurethane dispersion via the addition of water under a high shearing operation. Volatile solvent(s), if present, are distilled under reduced pressure.

Catalysts are not necessary for the preparation of the polyurethanes, but may provide advantages in a large scale manufacturing process. The catalysts most widely used are tertiary amines and organo-tin compounds such as stannous octoate, dibutyltin dioctoate and dibutyltin dilaurate.

Preparation of the polyurethane for subsequent conversion to a dispersion is facilitated by using a solvent. Suitable solvents are those that are miscible with water and inert to isocyanates and other reactants utilized in forming the polyurethanes. If it is desired to prepare a solvent-free dispersion, the solvent used should have sufficient volatility to allow its removal by distillation. Typical solvents useful in the practice of the disclosed embodiments are acetone, methyl ethyl ketone, toluene, sulfolane, tetraglyme, dipropylene glycol dimethyl ether, and N-methylpyrrolidone. Alternatively, the polyurethane can be prepared in a melt with less than 5% of solvent.

Mixtures of compounds or polymers having mixed NCO reactive groups can also be used in the preparation of the polyurethane of the disclosed embodiments.

Processing conditions for preparing the NCO containing prepolymers are well known to one skilled, in the art. The finished NCO-containing prepolymer should have an isocyanate content of from about 1 to about 20%, typically from about 1 to about 10% by weight, based on the weight of prepolymer solids.

As described above, a sufficient amount of the ionic groups must be neutralized so that the resulting polyurethane can have a proper balance of hydrophilicity and hydrophobicity. Typically the degree of neutralization is from 40% to 100%, and more typically from 50% to 70%, depending on the acid number of the polyurethane.

Suitable neutralizing agents for converting the acid groups to salt groups include tertiary amines, alkali metal cations and ammonia. Neutralizing agents can be trialkyl-substituted tertiary amines, such as triethyl amine, tripropyl amine, dimethylcyclohexyl amine, dimethylethanol amine, and triethanol amine and dimethylethyl amine. Substituted amines such as diethyl ethanol amine or diethanol methyl amine are also useful neutralizing agents.

Neutralization may take place at any point in the process. Typical procedures include neutralization during water addition and inversion process.

The capping agent for terminating the polyurethane chain is usually a primary or secondary amine, an alcohol, or a mecapto. The amount of capping agent employed should be approximately equivalent to the free isocyanate groups in the prepolymer. The ratio of active hydrogens from amine in the capping agent to isocyanate groups in the prepolymer is in the range of from about 1.0:1.0 to about 3.0:1.0, more typically from about 1.0:1.0 to about 1.5:1.0, and still more typically from about 1.0:1.0 to about 1.05:1, on an equivalent basis.

Conversion of the polyurethane obtained from the methods described above to an aqueous dispersion is completed by addition of de-ionized water. If desired, solvent can then be removed partially or substantially by distillation under reduced pressure. The final product is a stable, aqueous polyurethane dispersion having a solids content of up to about 60% by weight, typically from about 10% to about 60% by weight, and more typically from about 20% to about 45% by weight. However, it is always possible to dilute the dispersions to any minimum solids content desired. The solids content of the resulting dispersion may be determined by drying the sample in an oven at 150° C. for 2 hours and comparing the weights before and after drying. The particle size is generally below about 1.0 micron, and typically between about 0.01 to about 0.5 micron. The average particle size should be less than about 0.5 micron, and typically between about 0.01 to about 0.3 micron. The small particle size enhances the stability of the dispersed particles Preparation of Pigmented Dispersions The pigmented dispersions used in this disclosure can be prepared using any conventional milling process known in the art. Most milling processes use a two-step process involving a first mixing step followed by a second grinding step. The first step comprises mixing of all the ingredients, that is, pigment, dispersants, liquid carriers, neutralizing agent and any optional additives to provide a blended "premix". Typically all liquid ingredients are added first, followed by the dispersants, and lastly the pigment. Mixing is generally done in a stirred mixing vessel, and a high-speed disperser (HSD) is particularly suitable for the mixing step. A Cowels type blade attached to the HSD and operated at from 500 rpm to 4000 rpm, and more typically from 2000 rpm to 3500 rpm, provides optimal shear to achieve the desired mixing, Adequate mixing is usually achieved after mixing under the conditions described above for a period of from 15 to 1.0 minutes.

The second step comprises grinding of the premix to produce a pigmented dispersion. Typically, grinding involves a media milling process, although other milling techniques can also be used. In one embodiment, a lab-scale Eiger Minimill (Model M250, VSE EXP) manufactured by Eiger Machinery Inc., Chicago, Ill. is employed. Grinding was accomplished by charging about 820 grains of 0.5 YTZ® zirconia media to the mill. The mill disk is operated at a speed between 2000 rpm and 4000 rpm, and typically between 3000 trim and 3500 rpm. The dispersion is processed using a re-circulation grinding process with a typical flow rate through the mill at between 200 to 500 grams/minute, and more typically at 300 grams/minute. The milling may be done using a staged procedure in which a fraction of the solvent is held out of the grind and added after milling is completed. This is done to achieve optimal rheology that maximizes grinding efficiency.

The amount of solvent held out during milling varies by dispersion, and is typically between 200 to 400 grams for a batch size with a total of 800 grams. Typically, the dispersions of the present disclosure are subjected to a total of 4 hours of milling.

For black dispersions, an alternate milling process using a Microfluidizer can be used. Microfluidization is a non-media milling process in which milling is done by pigment impingement through nozzles under high pressures. Typically, pigment dispersions are processed at 15,000 psi with a flow rate of 400 grams/minute for a total of 12 passes through the mill. In making the black dispersions in the Examples, a lab-scale (Model M-110Y, available from Microfluidics of Newton, Mass.) high pressure pneumatic Microfluidizer with a diamond Z Chamber was employed.

Fillers, plasticizers, pigments, carbon black, silica sols, other polymer dispersions and the known leveling agents, wetting agents, antifoaming agents, stabilizers, and other additives known for the desired end use, may also be incorporated into the dispersions.

Preparation of Cross-linked Pigment Dispersion

In the cross-linking step, a cross-linking compound is mixed with the pigmented dispersions prepared above at room temperature or elevated temperature for a period from 6 h to 8 h. To facilitate the cross-linking reaction, it may be desirable to add a catalyst. Useful catalysts can be those that are either soluble or insoluble in the liquid and can be selected depending upon the crosslinking reactions. Some suitable catalysts include dibutyltin dilaurate (DBTDL), tributyl amine ("TBA") and dimethyldodecyl amine. After the cross-linking reaction is completed, the pH of the cross-linked dispersion can be adjusted to at least about 8.0, more typically to between 8.0 and 12.0, and most typically between 8.0 and 1.0, if needed. Optionally, the dispersion may be further processed using conventional filtration procedures known in the art. The dispersions may be processed using ultrafiltration techniques that remove co-solvents and other contaminants, ions or impurities from the dispersion. Each dispersion can be then tested for pH, conductivity, viscosity and particle size. Dispersion stability is deemed important to demonstrating the utility of the dispersant employed.

Fillers, plasticizers, pigments, carbon black, silica sols, other polymer dispersions and the known leveling agents, wetting agents, antifoaming agents, stabilizers, and other additives known for the desired end use, may also be incorporated into the dispersions.

Ink Vehicle

The pigmented ink of this disclosure comprises an ink vehicle typically an aqueous ink vehicle, also known as an aqueous carrier medium, the aqueous dispersion and optionally other ingredients.

The ink vehicle is the liquid carrier (or medium) for the aqueous dispersion(s) and optional additives. The term "aqueous ink vehicle" refers to an ink vehicle comprised of water or a mixture of water and one or more organic, water-soluble vehicle components commonly referred to as co-solvents or humectants. Selection of a suitable mixture depends on requirements of the specific application, such as desired surface tension and viscosity, the selected pigment, drying time of the pigmented ink jet ink, and the type of paper onto which the ink will be printed. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thiodiglycol, Sulfolane, 2-pyrrolidone, 1,3-dimethyl-2-imidazolidinone and caprolactam; glycols such as ethylene glycol, diethylene glycol, triethylene tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

A mixture of water and a polyhydric alcohol, such as diethylene glycol, is typical as the aqueous ink vehicle. In the case of a mixture of water and diethylene glycol, the ink vehicle usually contains from 30% water and 70% diethylene glycol to 95% water and 5% diethylene glycol, more typically from 60% water and 40% diethylene glycol to 95% water and 5% diethylene glycol. Percentages are based on the total weight of the ink vehicle. A mixture of water and butyl carbitol is also an effective ink vehicle.

The amount of ink vehicle in the ink is typically in the range of from 70% 99.8%, and more typically from 80% to 99.8%, by weight based on total weight of the ink.

The ink vehicle can be made to be fast penetrating (rapid drying) by including surfactants or penetrating agents such as glycol ethers and 1,2-alkanediols, Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. Typical 1,2-alkanediols are $C_4$-$C_6$ alkanediols with 1,2-hexanediol being most typical. Suitable surfactants include ethoxylated acetylene diols (e.g. Surfynol® series commercially available from Air Products), ethoxylated alkyl primary alcohols (e.g., Neodol® series commercially available from Shell) and secondary alcohols (e.g. Tergitol® series commercially available from Union Carbide), sulfosuccinates (e.g. Aerosol® series commercially available from Cytec), organosilicones (e.g. Silwet® series commercially available from Witco) and fluoro surfactants (e.g. Zonyl® series commercially available from DuPont).

The amount of glycol ether(s) and 1,2-alkanediol(s) added is typically in the range of from 1% to 15%, and more typically from 2% to 10% by weight, based on the total weight of the ink. Surfactants may be used, typically in the amount of from 0.01% to 5% and more typically from 0.2% to 2%, by weight based on the total weight of the ink.

Polymers other than polysaccharides and disaccharides may be added to the ink as binders to improve durability or other properties. The polymers can be soluble in the vehicle or in a dispersed form, and can be ionic or non-ionic. Soluble polymers include linear homopolymers and copolymers or block polymers. They can also be structured polymers including graft or branched polymers, stars and dendrimers. The dispersed polymers may include, for example, latexes and hydrosols. The polymers may be made by any known process including, but not limited to, free radical, group transfer, ionic, condensation and other types of polymerization. The polymers may be made by a solution, emulsion, or suspension polymerization process. Preferred classes of polymer additives include anionic acrylic, styrene-acrylic and polyurethane polymer.

When a polymer is present, the polymer level is typically between about 0.01% and about 3% by weight, based on the total weight of an ink. The upper limit is dictated by ink viscosity or other physical limitations Biocides may be used to inhibit growth of microorganisms.

Pigmented ink jet inks typically have a surface tension in the range of about 20 mN·m$^{-1}$ to about 70 mN·m$^{-1}$, at 25° C. Viscosity can be as high as 30 mPa·s at 25° C., but is typically somewhat lower. The ink has physical properties compatible with a wide range of ejecting conditions, materials construction and the shape and size of the nozzle. The inks should have excellent storage stability for periods so as not to clog to a significant extent in an ink jet apparatus. Further, the ink should not corrode parts of the ink jet printing, device it comes in contact with, and it should be essentially odorless and non-toxic.

Although not restricted to any particular viscosity range or printhead, the inks of the disclosure are particularly suited to lower viscosity applications. Thus the viscosity (at 25° C.) of the inks of this disclosure may be less than about 7 mPa·s, or less than about 5 mPa·s, and even more advantageously, less than about 3.5 mPa·s The following, examples illustrate the embodiments of the present disclosure without, however, being limited thereto.

EXAMPLES

Extent of Polyurethane Reaction

The extent of polyurethane reaction was determined by a titration with dibutylamine to detect the isocyanate content (NCO%), a common method used in urethane chemistry.

In this method, a sample of the isocyanate containing prepolymer is reacted with a known amount of dibutylamine solution, and the residual amine is back titrated with aqueous HCl.

Particle Size Measurements

The particle size for the polyurethane dispersions, pigments and the inks were determined by dynamic light scattering using a Microtrac® UPA 150 analyzer from Honeywell/Microtrac (Montgomeryville Pa.).

This technique is based on the relationship between the velocity distribution of the particles and the particle size. Laser generated light is scattered from each particle and is Doppler shifted by the particle Brownian motion. The frequency difference between the shifted light and the unshifted light is amplified, digitalized and analyzed to derive the particle size distribution. Results are reported as Mv, D50, D95 and %<204 nm Solid Content Measurement Solid content for the solvent free polyurethane dispersions was measured with a moisture analyzer, Model MA50 from Sartorius. For polyurethane dispersions containing a high boiling solvent, such as NMP, tetraethylene glycol dimethyl ether, or sulfolane, the solid content was determined by the weight difference before and after baking in an oven set at 150° C. oven for 180 minutes.

Preparation of Polyurethane Dispersants

A total of five polyurethane dispersants as listed in Table 1 below were prepared, These dispersants were later used for preparing pigmented dispersions and crossed-linked pigment dispersions.

TABLE 1

| Dispersant # | Polyurethane Structure |
| --- | --- |
| Dispersant 1 | Tergitol Terminated TMXDI/Terathane650 |
| Dispersant 2 | Taurine Terminated TMXDI/UH-50 |
| Dispersant 3 | Taurine Terminated IPDI/Terathane650 |
| Dispersant 4 | PolyEPS terminated TMXDI/UH-50 |
| Dispersant 5 | PolyEPS terminated TMXDI/Terathane 650 |

Polyurethane Dispersant 1 (Tergitol Terminated TMXDI/Terathane650)

To a dry, alkali- and acid-free flask equipped with an additional funnel, a condenser and a stirrer, under a nitrogen atmosphere was added Terathane® 650 (156 DMPA (94.4 g), Stafolane (220 g) and DBTL (0.06 g). The resulting mixture was heated to 60° C. and thoroughly mixed. To this mixture was added TMXDI (236 g) via the additional funnel mounted on the flask followed by rinsing any residual TMXDI in the additional funnel into the flask with Sulfolane (15 g). The temperature for the reaction mixture was raised to 100° C. and maintained at 100° C. until the isocyanate content reached 1.2% or below. The temperature was then cooled to 90° C. and maintained at 90° C. while Tergitol 15-S-7 (65.7 g) and BMEA (0.6 g) were added via the additional funnel over a period of 5 minutes followed by rinsing with Sulfolane (5 g). After holding the temperature for 60 minutes at 90° C., aqueous KOH (637 g, 3% by weight) was added over a period of 10 minutes via the additional funnel followed by de-ionized water (402 g). The mixture was maintained at 60° C. for 1 hr and cooled to room temperature to provide a polyurethane dispersant with 29.6% of solids.

Polyurethane Dispersant 2 (Taurine Terminated TMXDI/UH-50)

To a dry, alkali- and acid-free flask equipped with an additional funnel, a condenser and a stirrer, under a nitrogen atmosphere was added Eternacoll® UH-50 (129 g), DMPA (96 g), Sulfolane (329 g) and DBTL (0.06 g). The resulting mixture was heated to 60° C. and thoroughly mixed. To this mixture was added. TMXDI (257 g) via the additional funnel mounted on the flask followed by rinsing any residual TMXDI in the additional funnel into the flask with Sulfolane (15 g). The temperature for the reaction mixture was raised to 100° C. and maintained at 100° C. until the isocyanate content reached 0.9% or below. The temperature was then cooled to 60° C. and maintained at 60° C. while aqueous Taurine solution (179 g, prepared by dissolving 17.8 g of Taurine and 8 g of KOH in 153.2 g of de-ionized water) was added via the additional funnel over a period of 5 minutes followed by rinsing the residual Taurine solution in the additional funnel into the flask with Sulfolane (5 g). After holding the temperature for 5 minutes at 60° C., aqueous KOH (757.4 g, 3% by weight) was added over a period of 10 minutes via the additional funnel followed by de-ionized water (5 g). The mixture was maintained at 60° C. for 1 hr and cooled to room temperature to provide a polyurethane dispersant with 33.5% of solids.

Polyurethane Dispersant 3 (Taurine Terminated IPDI/Terathane650)

To a 2 L reactor were charged PolyTHF (154.4 g, BASF, OH#178.4), dry Sulfolane (220.7 g) and DMPA (53.7 g). The mixture was heated to 78 and DBTL (0.11 g) was added. To the resulting mixture were added IPDI (154.6 g) over a period of 60 minutes followed by dry Sulfolane (25.8 g) while the reaction temperature was maintained at 80° C. The % NCO was 0.98% after 6 h. The reaction mixture was cooled to 50° C., and Taurine (49.7 g), dissolved in water (147.4 g) and aqueous 45% KOH (12.4 g), was added opera period of 5 minutes. After 20 minutes, the polyurethane solution was inverted under high speed mixing by adding a mixture of aqueous 45% KOH (25.0 g) and water (349.4 g) followed by additional water (318.7 g). The polyurethane dispersant thus prepared contained 27.12% of solids, had a viscosity of 11.4 cPs, a pH of 6.96, and a measured Mn of 10333 with a polydispersity index of 3.0.

Polyurethane Dispersant 4 (PolyEPS terminated TMXDI/UH-50)

To a dry, alkali- and acid-free flask equipped with an additional funnel, a condenser and a stirrer, under a nitrogen atmosphere was added Eternacoll® UH-50(103 g), DMPA (77 g), Sulfolane (234 g) and DBTL (0.06 g). The resulting mixture was heated to 60° C. and thoroughly mixed. To this mixture was added TMXDI (202 g) via the additional flannel mounted on the flask followed by rinsing any residual TMXDI in the additional funnel into the flask with Sulfolane (15 g). The temperature for the reaction mixture was raised to 100° C. and maintained at 100° C. until the isocyanate content reached 0.7% or below. The temperature was then cooled to 90° C. and maintained at 90° C. while Poly-EPS 520-Na (23 g) was added via the additional funnel over a period of 5 minutes followed by rinsing the residual Poly-EPS 520-Na in the additional funnel into the flask with Sulfolane (5 g). After holding the temperature for 60 minutes at 90° C., aqueous KOH (109.15 g, 3% by weight) was added over a period of 10 minutes via the additional funnel followed by de-ionized water (5 g). The mixture was maintained at 60° C. for 1 hr and cooled to room temperature to provide a polyurethane dispersant with 28.2% of solids.

Polyurethane Dispersant 5 (PolyEPS terminated TMXDI/Terathane 650)

To a dry, alkali- and acid-free flask equipped with an additional funnel, a condenser and a stirrer, under a nitrogen atmosphere was added Terathane® 650 (103 g), DMPA (77 g), Sulfolane (227 g) and DBTL (0.06 g). The resulting mixture was heated to 60° C. and thoroughly mixed. To this mixture was added TMXDI (190 g) via the additional funnel mounted on the flask followed by rinsing any residual TMXDI in the additional funnel into the flask with Sulfolane (15 g). The temperature for the reaction mixture was raised to 100° C. and maintained at 100° C. until the isocyanate content reached 0.7% or below. The temperature was then cooled to 90° C. and maintained at 90° C. while Poly-EPS 520-Na (25 g) was added via the additional funnel over a period of 5 minutes followed by rinsing the residual Poly-EPS 520-Na in the additional funnel into the flask with Sulfolane (5 g). After holding the temperature for 60 minutes at 90° C., aqueous KOH (851 g, 3% by weight) was added over a period of 10 minutes via the additional funnel followed by de-ionized water (5 g). The mixture was maintained at 60° C. for 1 hr and cooled to room temperature to provide a polyurethane dispersant with 30.65% of solids.

Preparation of Pigmented Dispersions

Pigmented dispersions were prepared with magenta and cyan pigments. For the examples in Table 2, PR122 (magenta) and TRB-2 (cyan) were employed.

The following procedure was used to prepare pigmented dispersions with the polyurethane dispersants listed in Table 1. Using an Eiger Minimill, a premix was prepared at typically 20-30% pigment loading and the targeted dispersant level was selected at a pigment/dispersant (P/D) ratio of 1.5-3.0. A P/D of 2.5 corresponds to a 40% dispersant level on pigment. Optionally, a co-solvent was added at 10% of the total dispersion formulation to facilitate pigment wetting and dissolution of dispersant in the premix stage and ease of grinding during milling stage. Although other similar co-solvents are suitable, triethylene glycol monobutyl ether (TEB as supplied from Dow Chemicals) was the co-solvent of choice. The polyurethane dispersants of the present disclosure were pre-neutralized with either KOH to facilitate solubility and dissolution into water. During the premix stage, the pigment level was maintained at typically 27 and was subsequently reduced to about 24% during the milling stage by the addition of de-ionized water for optimal media mill grinding conditions. After completion of the milling stage, which was typically 4 hours, the remaining letdown of de-ionized water was added and thoroughly mixed.

All the pigmented dispersions processed with no-solvent were purified using an ultrafiltration process to remove co-solvent(s) and filter out other impurities that may be present. After completion, the pigment levels in the dispersions were reduced to about 10 to 15%. A total of 5 magenta (M1-M5), 2 cyan (C1 and C2) and 3 yellow (Y1, Y2 and Y3) dispersions listed in Table 2 were prepared using the polyurethane dispersants of the present disclosure.

TABLE 2

| Pigmented Dispersion | Pigment | P/D | Polyurethane Dispersant |
|---|---|---|---|
| M1 | PR122 | 3 | Dispersant 1 |
| M2 | PR122 | 3 | Dispersant 2 |
| M3 | PR122 | 3 | Dispersant 3 |
| M4 | PR122 | 3 | Dispersant 4 |
| M5 | PR122 | 3 | Dispersant 5 |
| C1 | TRB2 | 3 | Dispersant 1 |
| C2 | TRB2 | 3 | Dispersant 2 |
| Y1 | Y74 | 3 | Dispersant 2 |
| Y2 | Y74 | 3 | Dispersant 4 |
| Y3 | Y74 | 3 | Dispersant 5 |

Preparation of Cross-linked Pigment Dispersion

In the cross-linking step, a cross-linking compound Denacol® 321 was mixed with one of the pigmented dispersions listed in Table 2, and heated between 60° C. and 80° C. with efficient stirring for between 6 to 8 hours. After the cross-linking reaction was completed, the pH was adjusted to at least about 8.0 if needed. Listed in Table 3 below are 5 Cross-linked magenta (X1-M1-XL-M5), 2 cross-linked cyan (XL-C1-XL-C2) and 3 cross-linked yellow (XL-Y1-XL-Y3) pigment dispersions prepared. The corresponding pigmented dispersions, cross-linking moieties and mole ratios of cross-linking moiety to cross-linking compound are also listed in Table 3,

TABLE 3

| Cross-linked Dispersion | Pigmented Dispersion | Cross-linking Moiety | Mole Ratio of COOH:Epoxy |
|---|---|---|---|
| XL-M1 | M1 | COOH | 5:3 |
| XL-M2 | M2 | COOH | 5:2 |
| XL-M3 | M3 | COOH | 5:2 |
| XL-M4 | M4 | COOH | 5:3 |
| XL-M5 | M5 | COOH | 5:3 |
| XL-C1 | C1 | COOH | 5:1 |
| XL-C2 | C2 | COOH | 5:1 |
| XL-Y1 | Y1 | COOH | 5:1 |
| XL-Y2 | Y2 | COOH | 10:1 |
| XL-Y3 | Y3 | COOH | 10:1 |

Preparation of Inks

The inks were prepared by conventional processes known to one skilled in the art using pigmented dispersions as well as crossed-linked pigment dispersions made using the polyurethane dispersants described. The inks are processed by routine operations suitable for ink-jet ink formulation.

All ingredients except the pigmented dispersion or crossed-linked pigment dispersion are first mixed together. After these ingredients have been mixed, the pigmented dispersion, or crossed-linked pigment dispersion, is added. Inks were prepared by stirring together a pigmented dispersion or a crossed-linked pigment dispersion together with the vehicle ingredients listed in Table 4. Each dispersion was added in an amount that resulted in 3% of pigment solids in the final ink.

TABLE 4

| Vehicle Ingredient | Weight % in Ink |
|---|---|
| Butyl Cellosolve | 10.0 |
| Butyl Carbitol | 16.0 |
| 2-Pyrrolidone | 5.0 |
| De-ionized Water | Balance to 100% |

As listed in Table 5, Inks 1-10 were made using cross-linked pigment Dispersions XL-M1, XL-M2, XL-M3, XL-M4, XL-M5, XL-C1, XL-C2, XL-Y XL-Y2 and XL-Y3, and Inks 1A-10A were made using the corresponding un-cross-linked pigment Dispersions M1-M5, C1-C2 and Y1-Y3.

TABLE 5

| Ink No. | Dispersion | Initial Particle Size | | | | Particle size after aging at 60° C. for 72 hours | | | |
|---|---|---|---|---|---|---|---|---|---|
| | | Mv (nm) | D50 (nm) | D95 (nm) | % <204 nm | Mv (nm) | D50 (nm) | D95 (nm) | % <204 nm |
| 1 | XL-M1 | 96 | 88 | 160 | 99% | 135 | 125 | 238 | 88% |
| 1A | M1 | 524 | 433 | 1212 | 19% | 893 | 667 | 4980 | 3% |
| 2 | XL-M2 | 105 | 95 | 185 | 97% | 766 | 830 | 1366 | 3% |
| 2A | M2 | 429 | 319 | 1063 | 27% | 511 | 418 | 1045 | 8% |
| 3 | XL-M3 | 88 | 77 | 168 | 99% | 114 | 107 | 190 | 97% |
| 3A | M3 | 110 | 103 | 178 | 98% | 453 | 441 | 713 | 1% |
| 4 | XL-M4 | 102 | 96 | 168 | 99% | 109 | 98 | 200 | 96% |
| 4A | M4 | 546 | 377 | 1277 | 8% | 634 | 663 | 1082 | 4% |
| 5 | XL-M5 | 115 | 105 | 199 | 96% | 126 | 116 | 216 | 94% |
| 5A | M5 | 150 | 137 | 269 | 80% | 425 | 405 | 724 | 5% |
| 6 | XL-C1 | 83 | 74 | 150 | 99% | 89 | 82 | 151 | 100% |
| 6A | C1 | 102 | 84 | 211 | 94% | 472 | 427 | 861 | 1% |
| 7 | XL-C2 | 82 | 75 | 143 | 99.70% | 92 | 88 | 141 | 100% |
| 7A | C2 | 105 | 83 | 250 | 93% | 524 | 503 | 916 | 4% |
| 8 | XL-Y1 | 114 | 112 | 218 | 93% | 220 | 204 | 388 | 50% |
| 8A | Y1 | 108 | 101 | 186 | 97% | 385 | 367 | 610 | 1% |
| 9 | XL-Y2 | 128 | 125 | 197 | 96% | 146 | 133 | 259 | 83% |

TABLE 5-continued

| | | Initial Particle Size | | | | Particle size after aging at 60° C. for 72 hours | | | |
|---|---|---|---|---|---|---|---|---|---|
| Ink No. | Dispersion | Mv (nm) | D50 (nm) | D95 (nm) | % <204 nm | Mv (nm) | D50 (nm) | D95 (nm) | % <204 nm |
| 9A | Y2 | 106 | 96 | 191 | 97% | 193 | 174 | 361 | 66% |
| 10 | XL-Y3 | 116 | 104 | 220 | 93% | 160 | 155 | 252 | 81% |
| 10A | Y3 | 98 | 84 | 194 | 96% | 430 | 376 | 797 | 1% |

Testing of Stability

The initial particle sizes (Mv, D50, D95 and %<204 nm) of each ink at room temperature as well as particle sizes after aging at 60° C. for 72 hours were measured and summarized in Table 5. Growth of particle size after a dispersion is formulated into an ink is an indication of dispersion instability in the formulated ink vehicle. As shown in Table 5, Inks 1-7, made with cross-linked pigment dispersions, were found to be more stable upon formulation when compared to the corresponding inks made with the un-cross-linked counterparts. Inks 8-10 were found to have comparable stability as Inks 8A-10A upon formulation. Inks 1, 3-10 made with cross-linked pigment dispersions were found to be stable after the aging test. Inks 1A, 3A-10A made with the un-cross-linked pigment dispersion were found to be unstable with significant increases in particle sizes after the aging test. Thus the inventive cross-linked pigment dispersions demonstrated improved stability compared to their non-cross-linked counterparts.

Testing of Print Reliability

The dispersions were formulated into inks using a standard inkjet ink vehicle targeting for a pigment concentration of 3%. Each ink was filled into an HP88 cartridge and printed using an HP K5400 printer (Hewlett-Packard Co.). The reliability test consisted of repeatedly printing a test image until all the ink in the cartridge was consumed. Typically, this takes about 160 pages. After every ten pages of printing, a nozzle check pattern is printed and the number of nozzles in the print head not firing (missing) is counted. The print head has approximately 1,056 nozzles. The average number of missing nozzles, alternatively referred to as average nozzle outs, is used as a measure of print reliability. In addition, a test pattern is printed every ten pages and evaluated for print quality. The mean line width deviation of a 0.5 pt line is measured as an indication of misdirectionality of jetting. The variation in the number of dots counted in a square $1/64^{th}$ tone, referred to as dot number deviation, is used as an indication of jetting sustainability. The value of average nozzle outs, together with the values of mean line width deviation and dot number deviation, provides an overall measure of reliability for an ink. In general, the lower the values, the better the print reliability.

Results summarized, in Table 6 below showed that cyan and yellow inks made with cross-linked pigment dispersions demonstrated better print reliability compared to the corresponding inks made with the un-cross-linked pigment dispersions. Although magenta inks made with cross-linked pigment dispersions showed poorer print reliability compared, those made with the un-cross-linked counterparts, they remain jetable without severe clogging of printheads.

TABLE 6

| Ink No. | Dispersion | Mean Line Width Deviation | Dot Number Deviation | Average Nozzle Outs |
|---|---|---|---|---|
| 1 | XL-M1 | 15 | 4 | 1 |
| 1A | M1 | 18 | 3 | 2 |
| 2 | XL-M2 | 42 | 15 | 67 |
| 2A | M2 | 14 | 4 | 2 |
| 3 | XL-M3 | 130 | 177 | 329 |
| 3A | M3 | 21 | 23 | 105 |
| 4 | XL-M4 | 13 | 6 | 375 |
| 4A | M4 | 24 | 3 | 2 |
| 5 | XL-M5 | 76 | 5 | 14 |
| 5A | M5 | 27 | 3 | 3 |
| 6 | XL-C1 | 14 | 8 | 2 |
| 6A | C1 | 16 | 13 | 2 |
| 7 | XL-C2 | 18 | 27 | 8 |
| 7A | C2 | 31 | 13 | 21 |
| 8 | XL-Y1 | 19 | 10 | 0 |
| 8A | Y1 | 19 | 8 | 0 |
| 9 | XL-Y2 | 13 | 7 | 3 |
| 9A | Y2 | 14 | 3 | 103 |
| 10 | XL-Y3 | 20 | 5 | 2 |
| 10A | Y3 | 27 | 7 | 7 |

What is claimed is:

1. An aqueous pigment dispersion comprising a colorant and a polyurethane dispersant, wherein said polyurethane dispersant is comprised of a polymer with:
   (a) an aqueous dispersing moiety, wherein said dispersing moiety is pendant to the polymer backbone and terminal to the polymer chain, and said dispersing moiety is selected from the group consisting of —COOM, —OPO$_3$M$_2$, —PO$_3$M$_2$, —SO$_3$M, —(CH$_2$CHR$^5$O)$_n$—CH$_3$, and mixtures thereof; and
   (b) a cross-linkable moiety that is cross-linked with a cross-linking agent, wherein said cross-linkable moiety is pendent to the polymer backbone;
   wherein the polyurethane dispersant comprises at least one compound of the general structure of Formula I:

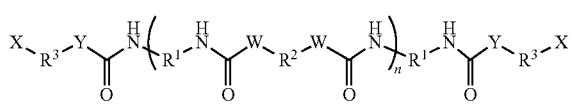

(I)

wherein each X is independently —OPO$_3$M$_2$, —PO$_3$M$_2$, —SO$_3$M or —(CH$_2$CHR$^5$O)$_n$—CH$_3$;
each M is independently Na, K, Li, H or N(R$^6$)$_4$;
each Y is independently O, S or NR$^4$;
each W is independently N, O or S;
each R$^1$ is independently C$_1$-C$_{20}$ alkyl, C$_3$-C$_{20}$ substituted alkyl, C$_6$-C$_{40}$ aryl or C$_9$-C$_{40}$ substituted aryl;
R$^2$ is comprised of difunctional isocyanate reactants Z$^1$ and Z$^2$, and a hydrophobic polyol Z$^3$, wherein there is at least one Z$^1$, at least one Z$^2$ and at least one Z$^3$;

each $R^3$ is independently $C_1$-$C_{20}$ alkyl, $C_3$-$C_{20}$ substituted alkyl or a straight bond, provided that when $R^3$ is a straight bond, X is —$(CH_2CHR^5O)_n$—$CH_3$;

each $R^4$ is independently —$R^3$—X, H, $C_1$-$C_{20}$ alkyl or $C_3$-$C_{20}$ substituted alkyl;

each $R^5$ is independently H or $C_1$-$C_{12}$ alkyl;

each $R^6$ is independently H, $C_1$-$C_{20}$ alkyl, $C_7$-$C_{20}$ aralkyl or $C_6$-$C_{40}$ aryl;

n is an integer from 2 to 30;

$Z^1$ is a difunctional isocyanate reactant substituted with an aqueous dispersing moiety;

$Z^2$ is a difunctional isocyanate reactant substituted with one or more cross-linkable moieties; and $Z^3$ is a hydrophobic polyol with MW less than 3000.

2. The pigment dispersion of claim 1, wherein the cross-linking agent is one or more members selected from the group consisting of epoxide, isocyanate, carbodiimide, N-methylol, oxazoline, silane, and mixtures thereof.

3. The pigment dispersion of claim 2, wherein $Z^1$ is a diol substituted with the aqueous dispersing moiety.

4. The pigment dispersion of claim 3, wherein $Z^2$ is a diol substituted with one or more cross-linkable moieties.

5. The pigment dispersion of claim 4, wherein the aqueous dispersing moiety consists of one or more carboxyl groups.

6. The pigment dispersion of claim 5, wherein the cross-linkable moiety consists of one or more carboxyl groups.

7. The pigment dispersion of claim 6, wherein Y is $NR^4$.

8. The pigment dispersion of claim 2, wherein each X is —$(CH_2CHR^5O)_n$—$CH_3$.

9. The pigment dispersion of claim 8, wherein $Z^1$ is a diol substituted with the aqueous dispersing moiety.

10. The pigment dispersion of claim 9, wherein $Z^2$ is a diol substituted with one or more cross-linkable moieties.

11. The pigment dispersion of claim 2, wherein each X is —$SO_3M$.

12. The pigment dispersion of claim 11, wherein $Z^1$ is a diol substituted with the aqueous dispersing moiety.

13. The pigment dispersion of claim 12, wherein $Z^2$ is a diol substituted with one or more cross-linkable moieties.

14. The pigment dispersion of claim 2, wherein each Y is $NR^4$ and each $R^4$ is —$R^3$—X.

15. The pigment dispersion of claim 14, wherein each W is O.

16. The pigment dispersion of claim 14, wherein each W is N.

17. The pigment dispersion of claim 2, wherein the mole ratio of the cross-linkable moiety to the cross-linking agent is from 15:1 to 1:1.5.

18. An aqueous ink jet ink comprising an aqueous ink vehicle and an aqueous pigment dispersion, wherein said aqueous pigment dispersion comprises a colorant and a polyurethane dispersant, wherein said polyurethane dispersant comprises a polymer with:

(a) an aqueous dispersing moiety, wherein said dispersing moiety is pendant to the polymer backbone and terminal to the polymer chain, and said dispersing moiety is selected from the group consisting of —COOM, —$OPO_3M_2$, —$PO_3M_2$, —$SO_3M$, —$(CH_2CHR^5O)_n$—$CH_3$, and mixtures thereof; and (b) a cross-linkable moiety that is cross-linked with a cross-linking agent, wherein said cross-linkable moiety is pendent to the polymer backbone;

wherein the polyurethane dispersant comprises at least one compound of the general structure of Formula I:

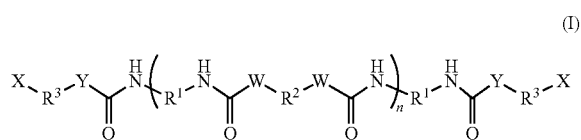

(I)

wherein each X is independently —$OPO_3M_2$, —$PO_3M_2$, —$SO_3M$ or —$(CH_2CHR^5O)_n$—$CH_3$;

each M is independently Na, K, Li, H or $N(R^6)_4$;

each Y is independently O, S or $NR^4$;

each W is independently N, O or S;

each $R^1$ is independently $C_1$-$C_{20}$ alkyl, $C_3$-$C_{20}$ substituted alkyl, $C_6$-$C_{40}$ aryl or $C_9$-$C_{40}$ substituted aryl;

$R^2$ is comprised of difunctional isocyanate reactants $Z^1$ and $Z^2$, and a hydrophobic polyol $Z^3$, wherein there is at least one $Z^1$, at least one $Z^2$ and at least one $Z^3$;

each $R^3$ is independently $C_1$-$C_{20}$ alkyl, $C_3$-$C_{20}$ substituted alkyl or a straight bond, provided that when $R^3$ is a straight bond, X is —$(CH_2CHR^5O)_n$—$CH_3$;

each $R^4$ is independently —$R^3$—X, H, $C_1$-$C_{20}$ alkyl or $C_3$-$C_{20}$ substituted alkyl;

each $R^5$ is independently H or $C_1$-$C_{12}$ alkyl;

each $R^6$ is independently H, $C_1$-$C_{20}$ alkyl, $C_7$-$C_{20}$ aralkyl or $C_6$-$C_{40}$ aryl;

n is an integer from 2 to 30;

$Z^1$ is a difunctional isocyanate reactant substituted with an aqueous dispersing moiety;

$Z^2$ is a difunctional isocyanate reactant substituted with one or more cross-linkable moieties; and $Z^3$ is a hydrophobic polyol with MW less than 3000.

19. The ink of claim 18, wherein $Z^1$ is a diol substituted with the aqueous dispersing moiety.

20. The ink of claim 19, wherein $Z^2$ is a diol substituted with one or more cross-linkable moieties.

* * * * *